Reissued Dec. 19, 1939

Re. 21,302

UNITED STATES PATENT OFFICE 21,302

PROCESS OF IMPROVING CARBON BLACK

Walther H. Grote, New York, N. Y., assignor to United Carbon Company, Inc., a corporation of Maryland No Drawing. Original No. 2,066,274, dated December 29, 1936, Serial No. 707,417, January 19, 1934. Application for reissue September 27, 1937, Serial No. 165,944

7 Claims. (Cl. 134—60)

This invention relates to a process for making an improved carbon black characterized by a low oil adsorption factor, improved dispersibility and particular adaptability for use as a color and reinforcing agent in rubber, plastics, lacquers, paints, enamels, inks and the like.

As is well known by those familiar with the art the oil adsorptive capacity of carbon blacks as a general rule increases proportionately to their color values. For obvious reasons a lower oil adsorption factor, if it could be produced without considerable decrease in color, would be extremely desirable and such a result has long been sought after in the art.

The oil adsorption factor is a familiar index of pigment evaluation and may be determined according to the method of the A. S. T. M. (D281–28T) in the following manner. One gram of the air dried sample is placed on a glass plate, refined raw linseed oil is added, drop by drop, from a volumetric burette until by thorough incorporation with the black by means of rubbing with a steel spatula, a stiff putty-like paste is produced which does not break or separate. The quantity of oil required for the purpose being then read on the burette and the pounds of oil required to wet 100 pounds of black calculated.

My invention provides a process resulting in an improved product in which the degree of selective adsorption of the individual particle is greatly reduced without detriment to the other pigmentary qualities.

In carrying out my invention I subject carbon black in its natural fine state of subdivision to attrition under controlled temperature, preferably in a non-oxidizing atmosphere, for example, in a ball mill provided with means of heating the charge and maintaining it at predetermined temperatures for prolonged periods. The balls employed for this purpose are preferably case hardened steel balls not exceeding ⅜ inch in diameter.

The quantitative reduction of the oil adsorption factor, achieved by the improved process, depends somewhat on the initial oil adsorption factor prior to treatment. The higher the initial factor, the greater will be the proportionate reduction, although several factors entering into the process may be varied so as to get different results. Among these factors are the time of treatment, speed of the machine, volume of charge, temperature control and atmospheric medium employed.

For example, if I intend to reduce an oil adsorption factor of 220 of a carbon black having an initial color value of 225 to an oil adsorption factor of 175, I find that by subjecting a three pound charge of such black to an attrition period of ten hours at 800° F. in a laboratory mill (size 10″ x 13″) running 50 R. P. M., satisfactory results may be obtained. While attrition at ordinary temperatures would destroy the color value of such black I find that under elevated temperatures this effect is greatly minimized. In the example cited above the initial color value of 225 is, for instance, only reduced to 220. This is especially the case if the treatment is accomplished in an atmosphere of inert gas such as carbon dioxide ($CO_2$).

I have found that the carbon black may be subjected to ball milling at a temperature of from 400° F. to 800° F. for periods varying from 5 to 15 hours to produce a highly improved carbon black as regards reduced oil adsorption, and the carbon black will have a color value of 200 or better. Milling for five hours gives from ⅔ to ¾ as much improvement as is produced by continuing the milling 15 hours. The oil adsorption decreases rather rapidly during the first few hours of milling, and later the proportionate decrease per hour becomes less, until after fifteen hours of continuous operation further milling produces only a relatively small decrease in oil adsorption per hour. I have further found that while the color loss is progressive during the milling, the net loss is slight when the temperature of the carbon black is maintained at least at 800° F. I have further found that a slow speed of the ball mill seems to give the best results. It should also be noted that while $CO_2$ is the most practical gas to use to provide an inert atmosphere, any non-oxidizing gas such as nitrogen may be used.

I have also found that carbon blacks so treated exhibit greatly improved dispersing qualities when admixed to rubber, plastics, lacquers, paints, enamels, inks and the like.

Since carbon black particles are of colloidal dimensions it is assumed that the attrition does not appreciably affect the particle size of the material, but merely changes the surface condition of the individual particle. The exact effect on the particles accomplished by this treatment is not yet definitely known, but it is believed that by this treatment the electrical charges upon the colloidal particles are changed, causing a coalescence, and effecting a reduction of the specific surface and/or a change in the surface tension of the particles thereby decreasing their oil adsorptive capacity.

Having described my invention and explained the operation thereof, I wish it to be understood that I do not confine myself to the precise choice of apparatus as mentioned, but may vary the same in any manner for the better carrying out of my invention without departing from the essential principle thereof.

I claim:

1. The process of improving carbon black by reducing the oil adsorption without substantially lowering the tinctorial value of the carbon black, which comprises subjecting the same to attrition in a non-oxidizing atmosphere at elevated temperatures.

2. The process of improving carbon black by reducing the oil adsorption without substantially lowering the tinctorial value of the carbon black, which comprises subjecting the same to attrition in an inert atmosphere at a temperature of above 400° F.

3. The process of improving carbon black by reducing the oil adsorption without substantially lowering the tinctorial value of the carbon black, which comprises subjecting the same to attrition for from about 5 to 15 hours, in an inert atmosphere at elevated temperatures.

4. The process of improving carbon black by reducing the oil adsorption without substantially lowering the tinctorial value of the carbon black, which comprises subjecting the same to attrition in an atmosphere of $CO_2$ for about 10 hours at a temperature of about 800° F.

5. The process of improving carbon black by reducing its oil adsorption value without substantially reducing its color value, which comprises subjecting the said carbon black to attrition in a non-oxidizing atmosphere where no chemical reaction takes place and while the carbon black is at a temperature within the range from about 400° F. to about 800° F. for from 5 to 15 hours.

6. The process of improving carbon black by reducing its oil adsorption value from 225 to 175 without substantially reducing its tinctorial value, which comprises subjecting the said carbon black to attrition in a non-oxidizing atmosphere while the carbon black is heated to a temperature of about 800° F. for about 10 hours.

7. A process for reducing the oil adsorption factor of carbon black without detriment to its pigmentary qualities which comprises subjecting dry carbon black to attrition at elevated temperatures in a rotary drum having attrition members therein and in the presence of an inert atmosphere for preventing oxidation of the carbon black.

WALTHER H. GROTE.